United States Patent
Sakai et al.

(10) Patent No.: US 9,804,454 B2
(45) Date of Patent: Oct. 31, 2017

(54) LIQUID CRYSTAL DISPLAY DEVICE

(71) Applicant: Japan Display Inc., Tokyo (JP)

(72) Inventors: Takeshi Sakai, Tokyo (JP); Toshimasa Ishigaki, Tokyo (JP); Satoru Kawasaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 116 days.

(21) Appl. No.: 14/815,779

(22) Filed: Jul. 31, 2015

(65) Prior Publication Data
US 2016/0041439 A1    Feb. 11, 2016

(30) Foreign Application Priority Data
Aug. 6, 2014   (JP) .................. 2014-160411

(51) Int. Cl.
| G02F 1/1343 | (2006.01) |
| G02F 1/1339 | (2006.01) |
| G02F 1/1368 | (2006.01) |
| G02F 1/1333 | (2006.01) |
| G02F 1/1337 | (2006.01) |
| G02F 1/1335 | (2006.01) |

(52) U.S. Cl.
CPC .... G02F 1/134363 (2013.01); G02F 1/13394 (2013.01); G02F 1/133707 (2013.01); *G02F 1/133512* (2013.01); *G02F 2001/13685* (2013.01); *G02F 2201/123* (2013.01)

(58) Field of Classification Search
None
See application file for complete search history.

(56) References Cited

U.S. PATENT DOCUMENTS

| 2005/0015840 A1* | 1/2005 | Biggerstaff ............ A41D 13/08 2/16 |
| 2005/0122452 A1* | 6/2005 | Yoshida ............ G02F 1/133555 349/114 |
| 2011/0109857 A1* | 5/2011 | Imanishi ........... G02F 1/133723 349/129 |
| 2012/0176559 A1 | 7/2012 | Fujikawa et al. |

FOREIGN PATENT DOCUMENTS

JP   2012-108541 A   6/2012

* cited by examiner

*Primary Examiner* — Ashok Patel
(74) *Attorney, Agent, or Firm* — Typha IP LLC

(57) ABSTRACT

In an IPS mode liquid crystal display device, an interlayer insulating film is formed on a common electrode formed in a planar shape, and a pixel electrode is formed on the interlayer insulating film. The distance between the TFT substrate and the counter substrate is determined by a columnar spacer. The pixel electrode includes one comb-shaped electrode and a contact part. The tip of the comb-shaped electrode overlaps the columnar spacer as seen in a plan view. The columnar spacer is present in the area in which an electric field that allows the liquid crystal molecules to rotate backward occurs when a voltage is applied to the pixel electrode, so that the reverse rotation of the liquid crystal molecules does not occur, and it is possible to prevent the domain from occurring.

2 Claims, 10 Drawing Sheets

LIQUID CRYSTAL DISPLAY DEVICE

CLAIM OF PRIORITY

The present application claims priority from Japanese Patent Application JP 2014-160411 filed on Aug. 6, 2014, the content of which is hereby incorporated by reference into this application.

BACKGROUND OF THE INVENTION (1) Field of the Invention

The present invention relates to a display device, and more particularly, to a liquid crystal display device with high definition screen driven by lateral electric field.

(2) Description of the Related Art

A liquid crystal display device includes a TFT substrate in which pixels each having a pixel electrode, a thin film transistor (TFT), and the like are arranged in a matrix form. A counter substrate is disposed opposite the TFT substrate. Further, a liquid crystal is interposed between the TFT substrate and the counter substrate. Then, the liquid crystal display device forms an image by controlling the transmittance of light for each pixel by the liquid crystal molecules. Liquid crystal display devices are flat and lightweight and have been applied in various fields. Small liquid crystal display devices are widely used in mobile phones, digital still cameras (DSC), or other portable devices.

The liquid crystal display device is required to determine the distance between the TFT substrate and the counter substrate. A method of determining the distance by forming a columnar spacer in the counter substrate or the TFT substrate can increase the accuracy in the determination of the distance. Patent Document 1 (Japanese Patent Application Laid-Open No. 2012-108541) describes a configuration of a liquid crystal display device in which a columnar spacer is formed on the counter substrate side in such a way that the columnar spacer is brought into contact with the part where a TFT is formed on the TFT substrate side, namely, the edge of the pixel to keep the distance between the TFT substrate and the counter substrate.

SUMMARY OF THE INVENTION

The viewing angle characteristics are a problem for the liquid crystal display device. The viewing angle characteristics are a phenomenon in which the brightness or chromaticity changes between when the screen is viewed from the front and when it is viewed in an oblique direction. The viewing angle characteristics are excellent in the In Plane Switching (IPS) mode for driving liquid crystal molecules by an electric field in the horizontal direction.

There are various methods for the IPS mode. For example, there is a method for forming a common electrode in a matted manner and providing a comb-shaped pixel electrode on the common electrode with an insulating film between them, to rotate liquid crystal molecules by an electric field generated between the pixel electrode and the common electrode. This method can relatively increase the transmittance and is now becoming mainstream. Meanwhile, the higher the resolution of the screen the smaller the area of a pixel, and as a result, the number of comb-shaped electrodes that configure the pixel electrode in the pixel can be only one.

In the IPS mode, when the pixel includes areas in which the directions of liquid crystal molecules are different, the so-called domain occurs at the boundary of the area in which the liquid crystal rotates in the forward direction and the area in which the liquid crystal rotates in the reverse direction. The domain is an area in which light leakage or scattering occurs in a black display, while not allowing light to pass through in a white display. Typically, the domain appears in a striped pattern with low or high transmittance and has a harmful effect on the brightness and contrast of the screen.

An object of the present invention is to prevent a domain from occurring in an IPS mode liquid crystal display device when the number of comb-shaped electrodes of a pixel electrode is reduced to one.

The present invention has been made to overcome the above problem. Some of the major aspects are as follows.

(1) There is provided a liquid crystal display device includes: a TFT substrate in which pixels each having a pixel electrode and a TFT are arranged in a matrix form; a counter substrate; and a liquid crystal interposed between the TFT substrate and the counter substrate. In the pixel, an interlayer insulating film is formed on a common electrode formed in a planar shape. Further, a pixel electrode is formed on the interlayer insulating film. The distance between the TFT substrate and the counter substrate is determined by a columnar spacer. The pixel electrode includes one comb-shaped electrode and a contact part, in which the tip of the comb-shaped electrode overlaps the columnar spacer as seen in a plan view.

(2) In the liquid crystal display device described in (1), the tip of the comb-shaped electrode of the pixel electrode is folded with the width gradually decreasing towards its end.

(3) There is provided a liquid crystal display device including: a TFT substrate in which pixels each having a pixel electrode and a TFT are arranged in a matrix form; a counter substrate; and a liquid crystal interposed between the TFT substrate and the counter substrate. In the pixel, an interlayer insulating film is formed on a common electrode formed in a planar shape. Further, a pixel electrode is formed on the interlayer insulating film. The distance between the TFT substrate and the counter substrate is determined by a columnar spacer. The pixel electrode includes one comb-shaped electrode and a contact part, in which the contact part of the comb-shaped electrode overlaps the columnar spacer as seen in a plan view.

(4) The liquid crystal display device described in (3), the base of the comb-shaped electrode with respect to the contact part overlaps the columnar spacer as seen in a plan view.

(5) The liquid crystal display device described in (3), the contact part has a corner part. The corner part overlaps the columnar spacer as seen in a plan view.

(6) There is provided a liquid crystal display device including: a TFT substrate in which pixels each having a pixel electrode and a TFT are arranged in a matrix form; a counter substrate; and a liquid crystal interposed between the TFT substrate and the counter substrate. In the pixel, an interlayer insulating film is formed on the pixel electrode formed in a planar shape. Further, a common electrode with a slit is formed on the interlayer insulating film. The distance between the TFT substrate and the counter substrate is determined by a columnar spacer, in which the tip of the slit of the common electrode overlaps the columnar space as seen in a plan view.

(7) In the liquid crystal display device described in (6), the tip of the slit of the common electrode is folded with the width gradually decreasing towards its end.

DETAILED DESCRIPTION OF THE PREFERRED EMBODIMENTS

Figure 1:
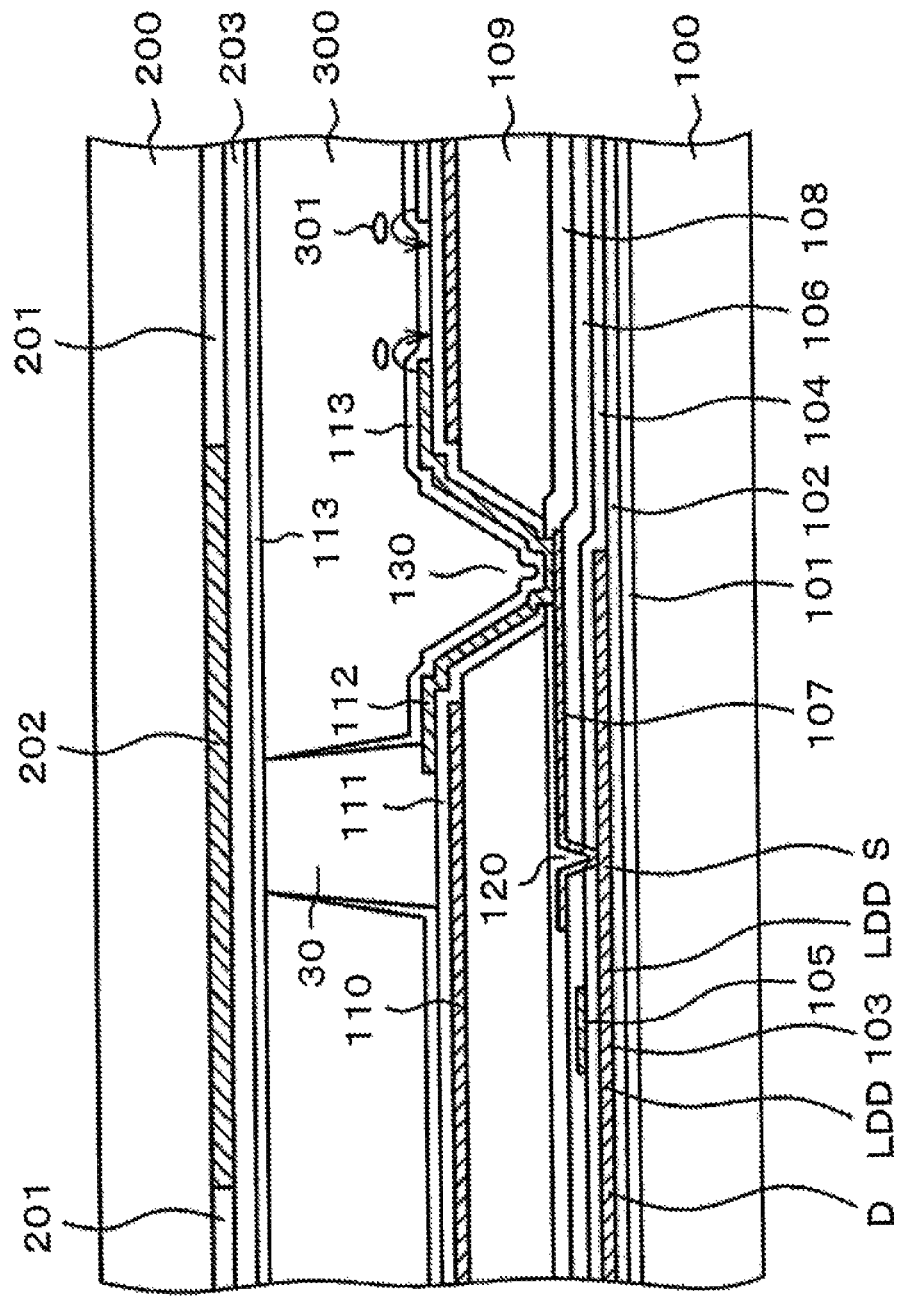
FIG. 1 is a cross-sectional view of a liquid crystal display device to which the present invention is applied.

Before describing the detailed pixel structure according to the present invention, the structure of a liquid crystal display device to which the present invention is applied is first described. FIG. 1 is a cross-sectional view of a liquid crystal display device to which the present invention is applied. In FIG. 1, a TFT is the so-called top gate type TFT, in which LTPS (Low Temperature Poly-Si) is used as the semiconductor. On the other hand, liquid crystal display devices using a-Si semiconductor often use the so-called bottom gate type TFT. The following description will focus on an example using the top gate type TFT. However, the present invention can also be applied to the case of using the bottom gate type TFT.

In FIG. 1, a first base film 101 of SiN as well as a second base film 102 of $SiO_2$ are formed by chemical vapor deposition (CVD) on a glass substrate 100. The role of the first base film 101 and the second base film 102 is to prevent a semiconductor layer 103 from being contaminated by impurities from the glass substrate 100.

The semiconductor layer 103 is formed on the second base film 102. The semiconductor layer 103 is formed in such a way that a-Si film is formed by CVD on the second base film 102 and is converted into poly-Si film by laser annealing. Then, the poly-Si film is patterned by photolithography.

A gate insulating film 104 is formed on the semiconductor layer 103. The gate insulating film 104 is SiO2 film of tetraethoxysilane (TEOS). This film is also formed by CVD. Then, a gate electrode 105 is formed on the gate insulating film 104. A scanning line 10 shown in FIG. 2 also functions as the gate electrode. The gate electrode 105 is formed, for example, of MoW film. An Al alloy is used if there is a need to reduce the resistance of the gate electrode 105 or the scanning line 10.

The gate electrode 105 is patterned by photolithography. In the patterning process, an impurity such as phosphorus, boron, or the like is doped by ion implantation in the poly-Si layer to form a source S or a drain D in the poly-Si layer. Further, the photoresist for patterning of the gate electrode 105 is used to form a lightly doped drain (LDD) layer between a channel layer of the poly-Si layer and the source S or drain D.

After that, a first interlayer insulating film 106 is formed of $SiO_2$ so as to cover the gate electrode 105. The role of the first interlayer insulating film 106 is to isolate the gate wiring 105 and a contact electrode 107. A through hole 120 is formed in the first interlayer insulating film 106 and the gate insulating film 104 to connect the source portion S of the semiconductor layer 103 to the contact electrode 107. The first interlayer insulating film 106 and the gate insulating film 104 are processed by photolithography at the same time to form the through hole 120.

The contact electrode 107 is formed on the first interlayer insulating film 106. The contact electrode 107 is connected to the pixel electrode 112 through a through hole 130. The drain D of the TFT is connected to the video signal line 20 shown in FIG. 2, through a through hole 140 at a portion not shown.

The contact electrode 107 and the video signal line are formed in the same layer at the same time. The contact electrode 107 and the video signal line (hereinafter represented by the contact electrode 107) use, for example, an AlSi alloy to reduce the resistance. The AlSi alloy forms a hillock, and Al diffuses into other layers. For this reason, the AlSi alloy has a structure in which AlSi is sandwiched, for example, by a barrier layer of MOW, not shown, and a cap layer.

An inorganic passivation film (insulating film) 108 is formed so as to cover the contact electrode 107 to protect the whole TFT. The inorganic passivation film 108 is formed by CVD similarly to the case of the first base film 101. An organic passivation film 109 is formed so as to cover the inorganic passivation film 108. The organic passivation film 109 is formed of photosensitive acrylic resin. The organic passivation film 109 may also be formed of other materials such as silicon resin, epoxy resin, and polyimide resin, in addition to acrylic resin. The organic passivation film 109 functions as a flattering film and is made thick. The film thickness of the organic passivation film 109 is usually between 1 and 4 µm and often about 2 µm.

The through hole 130 is formed in the inorganic passivation film 108 and in the organic passivation film 109 in order to establish electrical conductivity between the pixel electrode 112 and the contact electrode 107. The organic passivation film 109 uses photosensitive resin. After application of the photosensitive resin, the resin is exposed. Then, only the illuminated portion is dissolved in a specific developer. In other words, the use of the photosensitive resin can eliminate the formation of the photoresist. The through hole 130 is formed in the organic passivation film 109 which is then baked at about 230 degrees Celsius to complete the organic passivation film 109.

Figure 2:
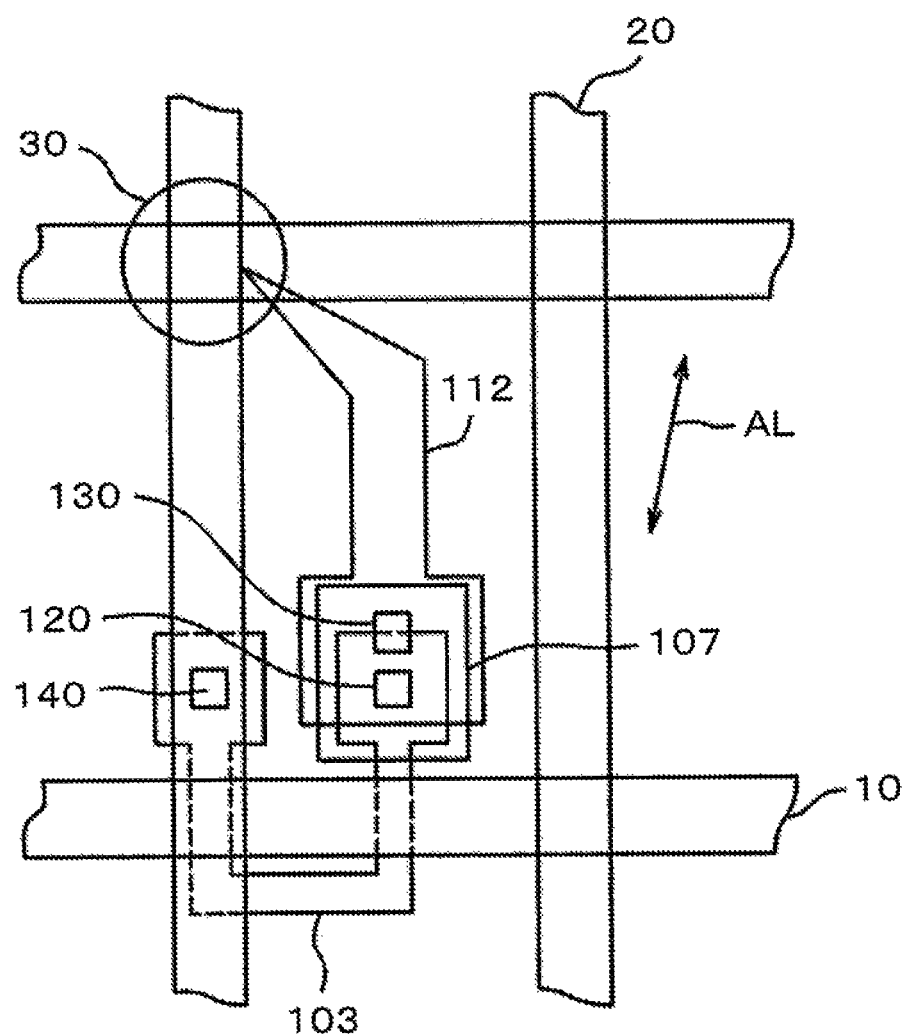
FIG. 2 is a perspective plan view of a pixel according to a first embodiment.

After that, an indium tin oxide (ITO) that serves as the common electrode 110 is formed by sputtering. Then, patterning is performed to remove the ITO from the through hole 130 and the periphery thereof. The common electrode 110 can be formed in a planar shape commonly to each of the pixels. Then, SiN as a second interlayer insulating film 111 is formed by CVD over the entire surface. Then, in the through hole 130, a through hole is formed in the second interlayer insulating film 111 and the inorganic passivation film 108 to establish electrical conductivity between the contact electrode 107 and the pixel electrode 112. Then, ITO is formed by sputtering and patterned to form the pixel electrode 112. The planar shape of the pixel electrode 112 according to the present invention is shown in FIG. 2 and subsequent figures.

A columnar spacer 30 is formed on the second interlayer insulating film 111. At this time, the columnar spacer 30 covers apart of the pixel electrode 112. The columnar spacer 30 can be formed of the same material as the organic passivation film 109. The organic material is formed to a thickness corresponding to the distance between the TFT substrate 100 and the counter substrate 200, and dried. Then, unwanted parts are removed by photolithography, and the remaining resist is baked to form the columnar spacer 30. In FIG. 1, the columnar spacer 30 overlaps a part of the pixel electrode 112. By overlapping the columnar spacer 30 with the pixel electrode 112, it is possible to prevent revere rotation of the liquid crystal molecules 301 in this area to prevent the occurrence of the domain.

In FIG. 1, the columnar spacer 30 is formed on the side of the TFT substrate 100 but may be formed on the side of the counter substrate 200. However, the accuracy of the position of the columnar spacer 30 is important because the columnar spacer 30 is formed to overlap only a specific part of the pixel electrode 112. When the columnar spacer 30 is formed on the side of the TFT substrate 100, the position of the pixel 112 can be determined based on the mask alignment accuracy. On the other hand, when the columnar spacer 30 is formed on the side of the counter substrate 200, the position of the columnar spacer 30 and the position of the pixel electrode 112 depend on the accuracy of the alignment between the TFT substrate 100 and the counter substrate 200. For this reason, it is better to form the columnar spacer 30 on the side of the TFT substrate 100 in order to align the columnar spacer 30 and the pixel electrode 112 with high accuracy.

An orientation film material is applied onto the pixel electrode 112, the second interlayer insulating film 111, and the columnar spacer 30 by flexographic printing, inkjet or other printing technologies, and baked to form the alignment film 113. The alignment film 113 is formed so as to cover the second interlayer insulating film 111, the pixel electrode 112, and the columnar spacer 30. The columnar spacer 30 has the height, so that the alignment film 113 on the columnar spacer 30 is made very thin due to the leveling. The alignment treatment of the alignment film 113 is performed by rubbing method or by a photo alignment method with polarized ultraviolet light.

When a voltage is applied between the pixel electrode 112 and the common electrode 110, lines of electric force are generated as shown in FIG. 1. The liquid crystal molecules 301 are rotated by the electric field to control the amount of light passing through a liquid crystal layer 300 for each pixel to form an image.

In FIG. 1, the counter substrate 200 is arranged opposite the TFT substrate 100 with the liquid crystal layer 300 between them. A color filter 201 is formed inside the counter substrate 200. The color filter 201 includes red, green, and blue color filters that are formed in each of the pixels, and in this way a color image is formed. A black matrix 202 is formed between the color filters 201 to improve the contrast of the image.

Note that the black matrix 202 also has a role of a light shielding film of the TFT that prevents light from flowing into the TFT. Further, the orientation of the liquid crystal is disturbed in the vicinity of the columnar spacer 30, so that the black matrix 202 also has a function to prevent the light from leaking in this area.

An overcoat film 203 is formed so as to cover the color filter 201 and the black matrix 202. The surfaces of the color filter 201 and the black matrix 202 are uneven, so that the uneven surfaces are smoothed by the overcoat film 203. The alignment film 113 is formed on the overcoat film 203 to determine the initial alignment of the liquid crystal. The alignment treatment of the alignment film 113 is performed by the rubbing method or by the photo alignment method, similarly to the case of the alignment film 113 on the side of the TFT substrate 100. Note that when the columnar spacer 30 is formed on the side of the counter substrate 200, it is formed on the overcoat film 203.

The configuration described above is an example and, for example, the inorganic passivation film 108 may not be formed in the TFT substrate 100 depending on the types of products. In addition, the formation process of the through hole 130 may be different depending on the types of products. Hereinafter, the present invention will be described in detail with reference to exemplary embodiments.

First Embodiment

FIG. 2 is a perspective plan view of a pixel part showing a first embodiment of the present invention. The pixel electrode 112 is formed in a region surrounded by scanning lines 10 and video signal lines 20. The pixel electrode 112 is one comb-shaped electrode. When the width of a pixel is reduced, it is difficult to place a plurality of comb-shaped electrodes within the pixel.

In FIG. 2, the semiconductor layer 103 is formed between the video signal line 20 and the pixel electrode 112. The semiconductor layer 103 is connected to the video signal line 20 through a through hole 140, and also connected to the contact electrode 107 through the through hole 120. The semiconductor layer 103 extends in a U-shape between the through hole 120 and the through hole 140, passing under the scanning line 10 twice. In FIG. 2, the scanning line 10 functions as the gate electrode 105, so that the TFT has a double gate structure. The position in the cross-sectional direction of each electrode or line is the same as described in FIG. 1.

The long axis of the pixel electrode 112 is in the direction perpendicular to the scanning line 10, namely, in the extending direction of the video signal line 20. The orientation direction AL of the orientation film 113 is inclined at a predetermined angle with respect to the extending direction of the video signal line 20. This angle is in the range from 5 to 20 degrees. This is in order to determine the rotation direction of the liquid crystal molecules 301 by the electric field. The rotation direction of the liquid crystal molecules 301 is unstable at the tip of the pixel electrode 112 and a domain occurs. In order prevent the domain from occurring, the tip of the pixel electrode 112 is folded with the width gradually decreasing towards its end.

The pixel electrode 112 is connected to the contact electrode 107 through the through hole 130. The pixel electrode 112 is supplied with a video signal through the TFT. The through hole 130 is made large, so that a contact part 1121 of the pixel electrode 112 is made wide enough to provide the area required to connect the pixel electrode 112 and the contact electrode 107.

In FIG. 2, the columnar spacer 30 is formed in the intersection between the scanning line 10 and the video signal line 20. Further, the tip of the pixel electrode 112 extends to the vicinity of the video signal line 20, and overlaps the columnar spacer 30 as seen in a plan view. In this way, the liquid crystal does not exist in the area in which the liquid crystal molecules are likely to rotate backward. Thus, it is possible to prevent the domain from occurring.

Figure 3:
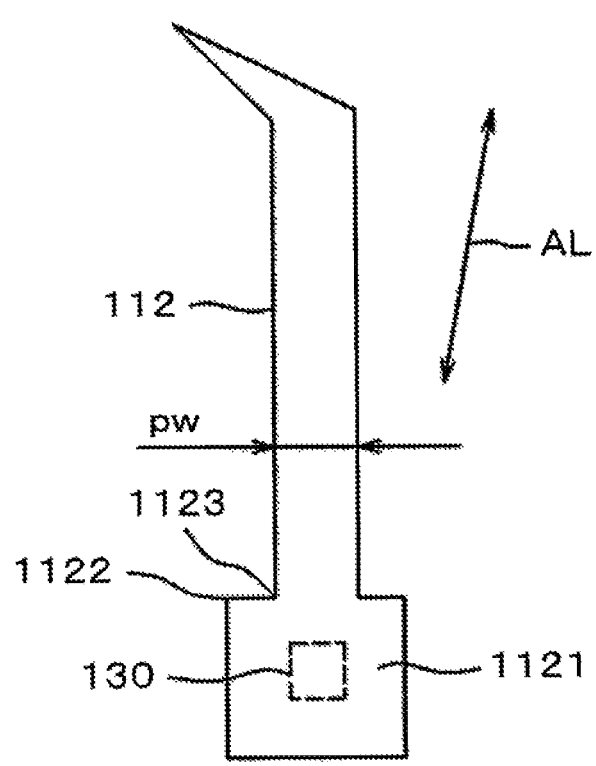
FIG. 3 is a plan view showing the shape of a pixel electrode.

FIG. 3 is a plan view showing the shape of the pixel electrode 112. In FIG. 3, the pixel electrode 112 is formed with one comb-shaped electrode and the contact part 1121. The width pw of the comb-shaped electrode is between 2 to 4 μm. The contact part 1121 is made wide enough to accommodate the hole 130. The contact part 1121 has a shoulder part 1122. The area in which the comb-shaped electrode is connected to the contact part 1121 is a base part 1123. The shoulder part 1122 may also be referred to as the corner part 1122. The tip of the pixel electrode 112 is folded with a triangular peak shape at the end in order to prevent the occurrence of the domain. The relationship between the occurrence of the domain and the pixel electrode, as well as the configuration of the present invention will be described below.

Figure 4:
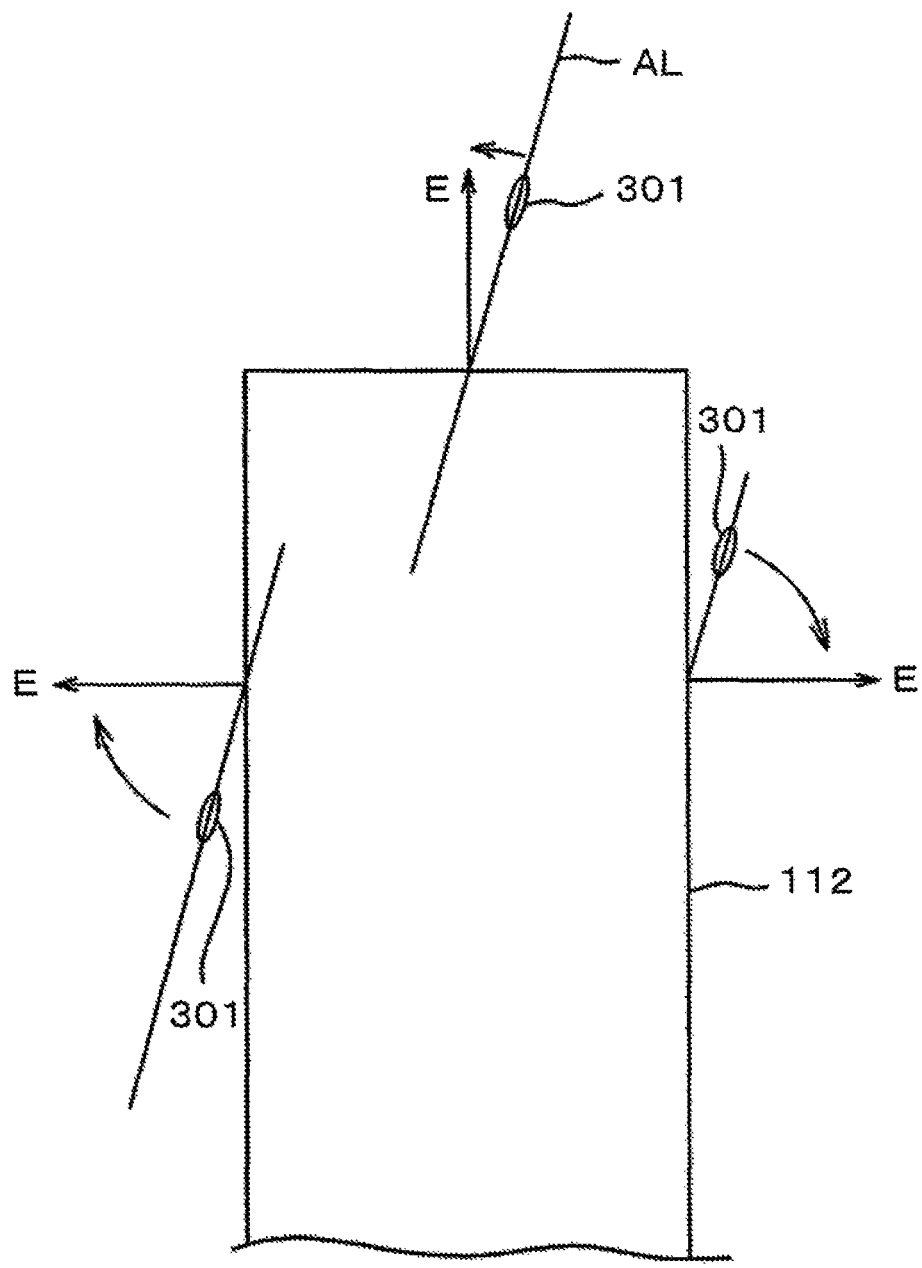
FIG. 4 is a plan view showing the rotation directions of the liquid crystal molecules in the conventional pixel electrode.

FIG. 4 is a plan view showing the orientation of the liquid crystal when the pixel electrode 112 simply has a rectangular shape without the folded part and the triangular peak at the tip. In FIG. 4, the planar common electrode is preset below the pixel electrode 112 through the interlayer insulating film. When a voltage is applied to the pixel electrode 112, lines of electric field are generated as indicated by the arrow E, as seen as seen in a plan view. On the other hand, the liquid crystal molecules 301, which are initially oriented in the direction of AL, rotate as indicated by the arrows when the voltage is applied to the pixel electrode 112. The liquid crystal molecule 301 having positive dielectric constant anisotropy is reoriented so that the long axis of the liquid crystal molecule 301 is aligned in the direction of the electric field. The orientation of the rotation of the liquid crystal molecule 301 relates to the occurrence of the domain. Note that the liquid crystal molecule 301 having negative dielectric constant anisotropy is reoriented so that the short axis of the liquid crystal molecule 301 is aligned in the direction of the electric field. The idea is the same in both cases, so that it is assumed in the following description that the liquid crystal molecule has positive dielectric constant anisotropy.

In FIG. 4, the liquid crystal molecule 301 close to the long side of the pixel electrode 112 rotates in a clockwise direction as indicated by the arrow when a voltage is applied to the pixel electrode 112. The liquid crystal molecule 301 rotates in the clockwise direction both on the right and left sides of the pixel electrode 112. On the other hand, the liquid crystal molecule 301 close to the short side of the pixel electrode 112 rotates in a counterclockwise direction when a voltage is applied to the pixel electrode 112. At this time, a domain occurs in the vicinity of the boundary between the long and short sides of the pixel electrode 112, leading to the degradation of the image quality.

Figure 5:
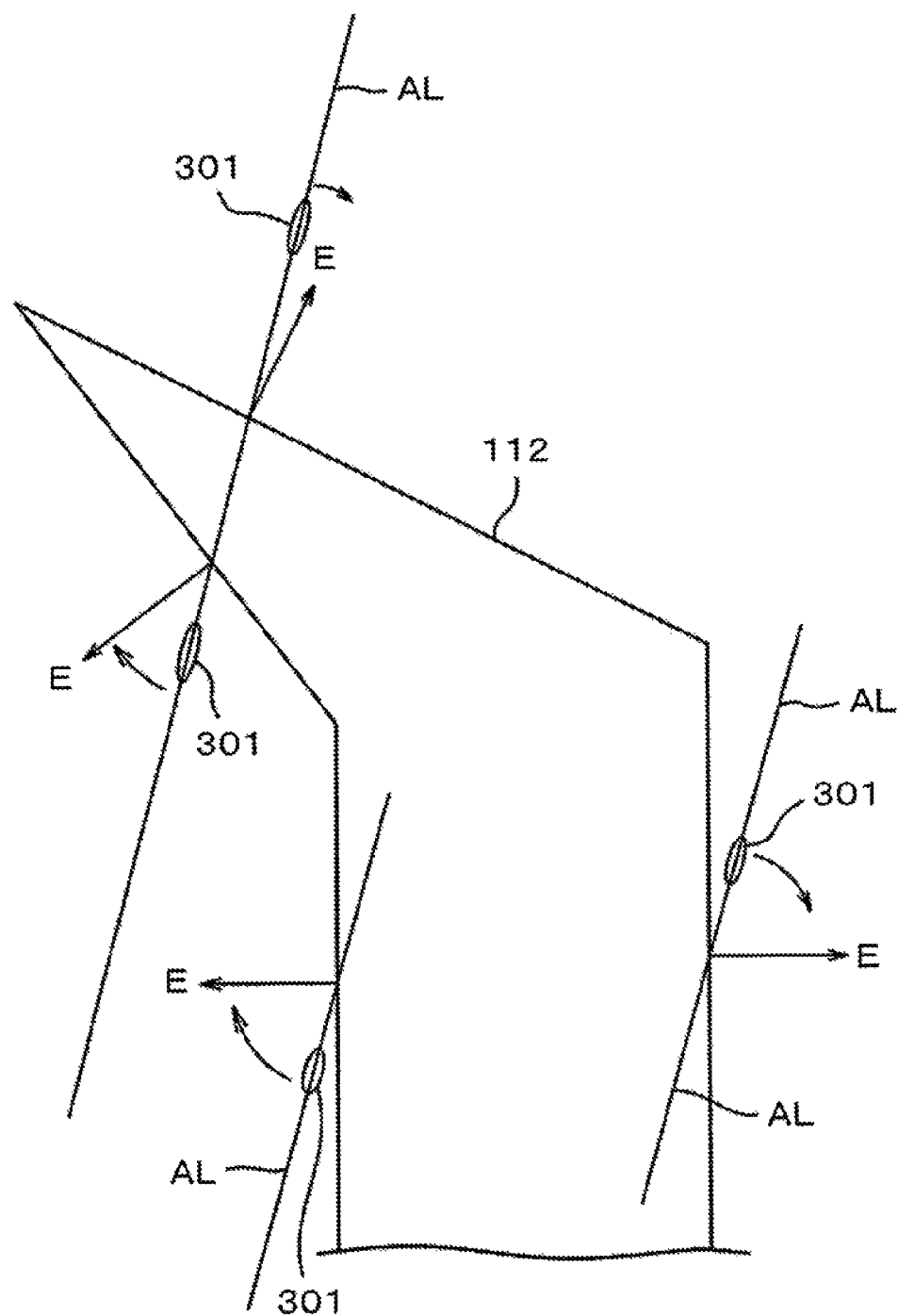
FIG. 5 is a plan view showing the operation of the pixel electrode designed to prevent the liquid crystal molecules from rotating backward.

FIG. 5 shows the configuration in which the tip of the pixel electrode 112 is folded with a triangular peak in order to prevent the occurrence of the domain. Also at the tip portion of the pixel electrode 112, the direction in which the liquid crystal molecule 301 is reoriented by the electric field is clockwise as indicated by the arrow. As a result, the shape of FIG. 5 can prevent the domain from occurring at the tip of the pixel electrode 112.

Figure 6:
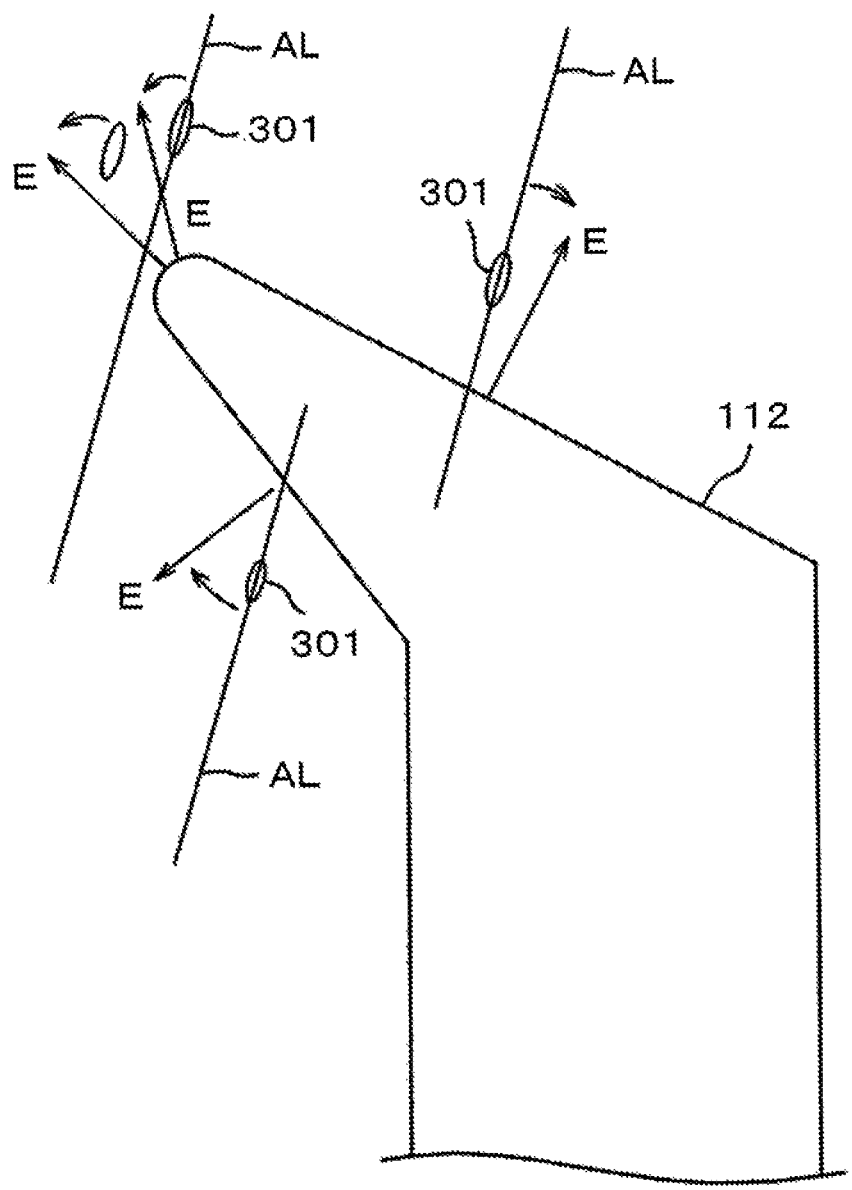
FIG. 6 is a plan view showing the rotation directions of the liquid crystal molecules in an actual pixel electrode.

However, FIG. 5 shows the state when the pixel electrode 112 is ideally patterned. In practice, after the patterning, the tip of the pixel electrode 112 is rounded at the end as shown in FIG. 6. In FIG. 6, the electric field of the tip of the pixel electrode 112 occurs in the direction perpendicular to the tangent to the pixel electrode 112. In this area, as shown in FIG. 6, the electric field occurs to allow the liquid crystal molecule 301 to rotate counterclockwise. On the other hand, in the parts except the tip of the pixel electrode 112, the liquid crystal molecules 301 rotate clockwise, so that a domain occurs in the vicinity of the tip of the pixel electrode 112. The range of the domain that occurs in the pixel electrode 112 is smaller than the range of the domain that occurs in the pixel electrode 112 of FIG. 4. However, the domain affects the molecular alignment of the surrounding liquid crystals. Thus, the range affected by the domain is wider than the area in which the orientation of the electric field is irregular.

Figure 7:
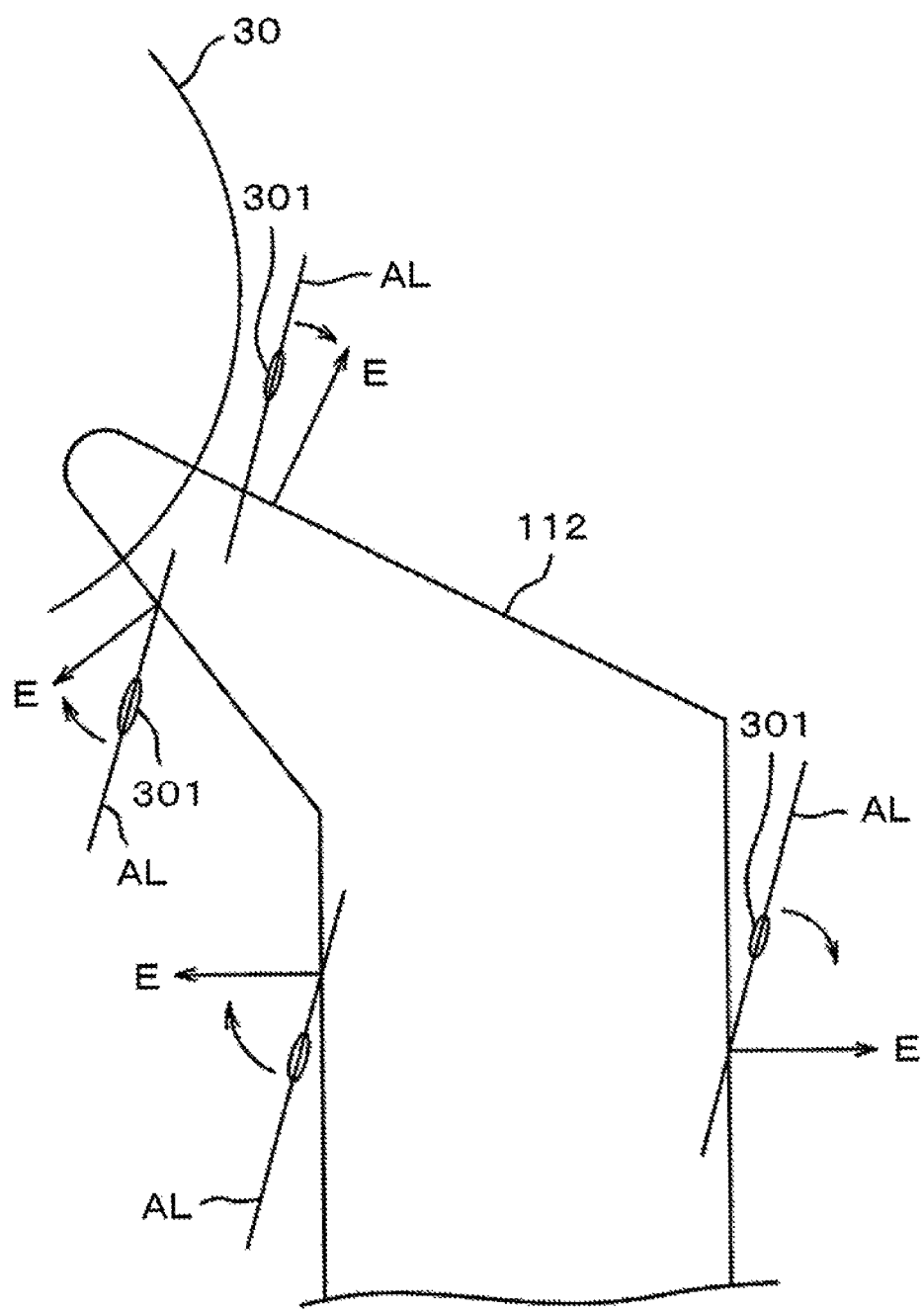
FIG. 7 is a plan view showing the rotation of the liquid crystal molecules in the vicinity of the tip of a pixel electrode according to the present invention.

An object of the present invention is to prevent the occurrence of the domain by overlapping the columnar spacer 30 with the tip of the pixel electrode as seen in a plan view, as shown in FIG. 7, to eliminate the liquid crystal molecules 301 from the area in which the liquid crystal molecules 301 are likely to rotate backward.

In FIG. 7, there may be an influence on the direction of the rotation of the liquid crystal molecules 301 may be influenced by the fact that the initial orientation of the liquid crystal molecules 301 is disturbed due to the presence of the columnar spacer 30. However, the influence is minor. Further, FIG. 7 shows the state in which the plane of the columnar spacer 30 is circular, but other shapes may also be used. In this case, the planar shape of the columnar spacer 30 should be determined based on the balance between the disturbance of the initial orientation of the liquid crystal molecule 301 due to the presence of the columnar spacer 30 and the rotation direction of the liquid crystal molecule 301.

As described above, according to the present embodiment, because nearly no liquid crystal molecules are present due to the overlap of the of the tip portion of the pixel electrode 112 with the columnar spacer 30, it is possible to prevent the domain from occurring and to achieve a liquid crystal display device with a high image quality even in high definition.

Second Embodiment

Figure 8:
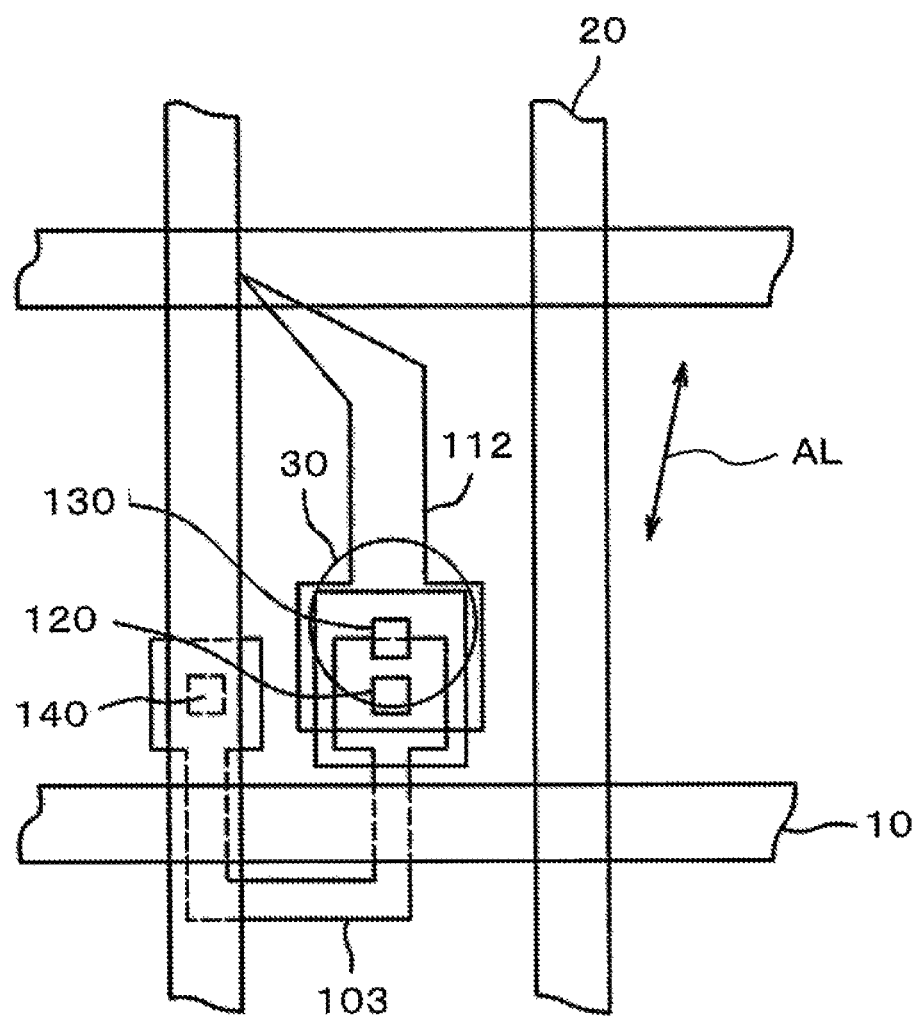
FIG. 8 is a perspective plan view of a pixel according to a second embodiment.

FIG. 8 is a plan view of a pixel part showing a second embodiment of the present invention. The feature in FIG. 8 is that a contact part 1121 of the pixel electrode 112 overlaps the columnar spacer 30 as seen in a plan view. In this way, it is possible to prevent the occurrence of the domain in the vicinity of the contact part 1121 of the pixel electrode 112. The other configurations in FIG. 8 are the same as those in FIG. 2 of the first embodiment.

Figure 9:
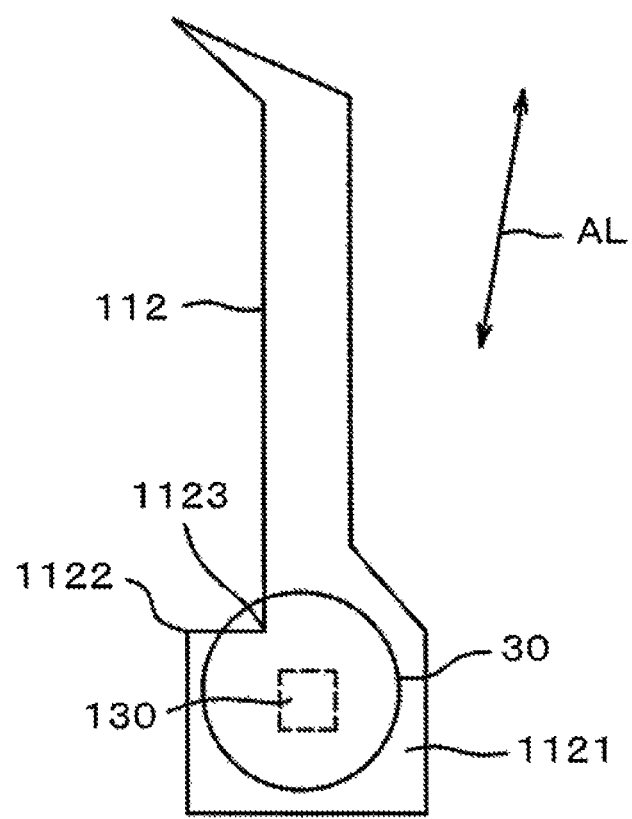
FIG. 9 is a plan view showing the positional relationship between the pixel electrode and the columnar spacer in FIG. 8.

FIG. 9 is a plan view showing the relationship between the pixel electrode 112 and the columnar spacer 30 in this embodiment. In FIG. 9, the columnar spacer 30 overlaps the pixel electrode 112 in the vicinity of the base part 1123 of the comb-shaped electrode with respect to the contact part as seen in a plan view. The liquid crystal molecules 301 are likely to rotate counterclockwise in the vicinity of the base part 1123. Thus, the columnar spacer 30 is provided in this area to eliminate the liquid crystal molecules 301 from this area, in order to significantly reduce the number of liquid crystal molecules 301 that rotate backward. Note that in FIG. 9, the right shoulder part of the pixel electrode 112 is inclined to reduce the occurrence of the reverse rotation of the liquid crystal.

Figure 10:
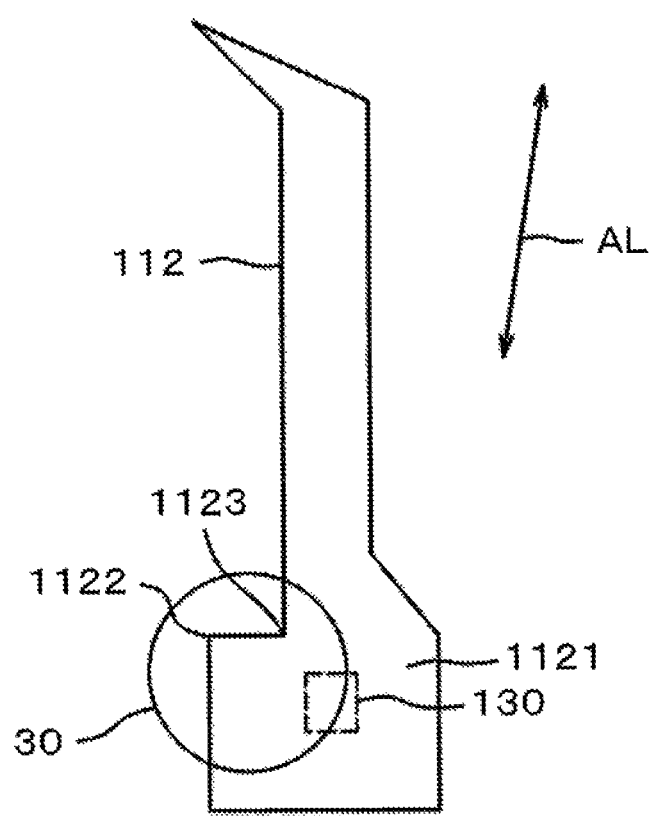
FIG. 10 is a plan view showing the positional relationship between the pixel electrode and the columnar spacer in another aspect of the second embodiment.

FIG. 10 is a plan view showing another aspect of the relationship between the pixel electrode 112 and the columnar spacer 30 in this embodiment. In FIG. 10, the base part 1123 of the comb-shaped electrode of the pixel electrode 112 as well as the corner part 1122 of the contact part 1121 overlap the columnar spacer 30 as seen in a plan view.

In FIG. 10, the initial orientation direction of the liquid crystal molecules 301 is indicated by the arrow AL. When the initial orientation is in such a direction, a domain is likely to occur in the vicinity of the contact part 1122 on the left side of the pixel electrode 112. In the present embodiment, the columnar spacer 30 is provided to overlap in the vicinity of the shoulder part 1122 and in the vicinity of the base part 1123, to eliminate the liquid crystal molecules 301 from this area to prevent the occurrence of the domain.

As described above, according to the present embodiment, it is possible to prevent the domain from occurring in the vicinity of the contact part of the pixel electrode, and thus to achieve a liquid crystal display device with high image quality even in high definition.

The combination of the configuration of the first embodiment and the configuration of the second embodiment can prevent both the occurrence of the domain at the tip portion of the pixel electrode and the occurrence of the domain in the vicinity of the contact part of the pixel electrode. However, the overlap of the columnar spacer with the pixel electrode as seen in a plan view can reduce the transmittance of the pixel. For this reason, the range of the overlap of the columnar spacer with the pixel electrode should be determined based on the balance between the transmittance and the contrast. Note that the columnar spacer may be formed on the TFT substrate side or on the counter substrate side.

The present invention has been described with respect to the configuration in which the pixel electrode with the comb-shaped electrode is provided on the planar common electrode through the interlayer insulating film. However, the operation can be the same as in the case in which the common electrode with a slit is formed on the planar pixel electrode through the interlayer insulating film. In this case also, the number of slits included in the common electrode is limited to one per pixel when the size of the pixel is reduced.

The present invention can also be applied to this case with the configuration of the first embodiment for the slit formed in the common electrode of the upper layer. In other words, the tip of the slit of the common electrode in the pixel is folded with the width decreasing towards its end. Then, the tip of the slit is overlapped with the columnar spacer as seen in a plan view, in order to prevent the liquid crystal molecules from rotating backward in the vicinity of the tip of the slit of the common electrode.

Note that even if the tip of the pixel electrode or the tip of the slit of the common electrode is designed to have a triangular peak shape, the actual shape of the tip is rounded as shown in FIG. 7. In other words, the pixel electrode or the slit of the common electrode has the tip whose width gradually decreasing towards its end.

Further, in the illustrated figures, it is assumed that the plane of the columnar space is circular. However, the plane shape of the columnar spacer may be rectangular or oval, as long as the plane shape does not allow the liquid crystal molecules to rotate backward. Further, in the above description, the tip of the pixel electrode is folded with the width gradually decreasing towards its end. However, the tip shape of the pixel electrode is not limited to this example. However, if the tip of the pixel electrode has a shape that can reduce the occurrence of the domain, the area in which the columnar spacer and the pixel electrode overlap can be reduced, so that it is possible to prevent the reduction of the brightness due to the presence of the columnar spacer within the pixel. This can be the same as for the shape of the slit formed in the common electrode.

What is claimed is:

1. A liquid crystal display device comprising:
a TFT substrate in which pixels each having a pixel electrode and a TFT are arranged in a matrix form;
a counter substrate; and
a liquid crystal interposed between the TFT substrate and the counter substrate,
wherein in the pixel, an interlayer insulating film is formed on a common electrode formed in a planar shape, and the pixel electrode is formed on the interlayer insulating film, wherein the distance between the TFT substrate and the counter substrate is determined by a columnar spacer,
wherein the pixel electrode includes one comb-shaped electrode and a contact part,
wherein a tip of the comb-shaped electrode overlaps the columnar spacer as seen in a plan view.

2. A liquid crystal display device according to claim 1, wherein the tip of the comb-shaped electrode of the pixel electrode is folded with the width gradually decreasing towards its end.

* * * * *